United States Patent
Ritzberger

(10) Patent No.: US 11,583,374 B2
(45) Date of Patent: Feb. 21, 2023

(54) PROCESS FOR THE PREPARATION OF A GLASS-CERAMIC BLANK FOR DENTAL PURPOSES

(71) Applicant: Ivoclar Vivadent AG, Schaan (LI)

(72) Inventor: Christian Ritzberger, Grabs (CH)

(73) Assignee: Ivoclar Vivadent AG, Schaan (LI)

( * ) Notice: Subject to any disclaimer, the term of this patent is extended or adjusted under 35 U.S.C. 154(b) by 799 days.

(21) Appl. No.: 16/540,734

(22) Filed: Aug. 14, 2019

(65) Prior Publication Data

US 2020/0069399 A1 Mar. 5, 2020

(30) Foreign Application Priority Data

Aug. 29, 2018 (EP) .................................... 18191475

(51) Int. Cl.
| | | |
|---|---|---|
| A61C 13/00 | (2006.01) | |
| C03C 10/00 | (2006.01) | |
| C03C 1/00 | (2006.01) | |
| C03C 1/02 | (2006.01) | |
| A61C 13/083 | (2006.01) | |
| C03B 32/02 | (2006.01) | |
| C03B 19/02 | (2006.01) | |

(52) U.S. Cl.
CPC ........ *A61C 13/0022* (2013.01); *A61C 13/083* (2013.01); *C03B 19/02* (2013.01); *C03B 32/02* (2013.01); *C03C 1/002* (2013.01); *C03C 1/026* (2013.01); *C03C 10/0009* (2013.01); *C03C 10/0063* (2013.01); *C03C 2204/00* (2013.01)

(58) Field of Classification Search
CPC ... A61C 13/0022; A61C 13/083; C03B 19/02; C03B 32/02; C03B 1/002; C03B 1/026; C03B 10/0009; C03B 10/0063; C03B 2204/00
See application file for complete search history.

(56) References Cited

U.S. PATENT DOCUMENTS

| 8,047,021 | B2 | 11/2011 | Schweiger et al. |
| 2007/0042889 | A1 | 2/2007 | Apel et al. |
| 2008/0120994 | A1 | 5/2008 | Schweiger et al. |
| 2009/0291820 | A1* | 11/2009 | Schweiger ............ C03C 4/0021 |
| | | | 501/5 |

FOREIGN PATENT DOCUMENTS

| DE | 102004056934 A1 | 5/2006 |
| DE | 102014116378 A1 | 5/2016 |
| EP | 1688397 A1 | 8/2006 |
| EP | 1688398 A1 | 8/2006 |

OTHER PUBLICATIONS

Gorman, Catherine M., et al. "Effects of repeated processing on the strength and microstructure of a heat-pressed dental ceramic." The Journal of Prosthetic Dentistry 112.6 (2014): 1370-1376. (Year: 2014).*

Gorman, Catherine M. et al., "Effects Of Repeated Processing On The Strength And Microstructure Of A Heat-Pressed Dental Ceramic," The Journal Of Prosthetic Dentistry, vol. 112, Issue 6, pp. 1370-1376, Dec. 2014.

* cited by examiner

*Primary Examiner* — Karl E Group
*Assistant Examiner* — Cameron K Miller
(74) *Attorney, Agent, or Firm* — Ann M. Knab; Thad McMurray

(57) ABSTRACT

The invention relates to a process for the preparation of a glass-ceramic blank for dental purposes with lithium silicate as crystal phase, in which lithium silicate blanks that are no longer required and in particular residues thereof are used as starting material and which allows the production of a homogeneous starting glass within a short time.

17 Claims, No Drawings

PROCESS FOR THE PREPARATION OF A GLASS-CERAMIC BLANK FOR DENTAL PURPOSES

CROSS-REFERENCE TO RELATED APPLICATIONS

This application claims priority to European patent application No. 18191475.5 filed on Aug. 29, 2018, the disclosure of which is incorporated herein by reference in its entirety.

TECHNICAL FIELD

The invention relates to a process for the preparation of a glass-ceramic blank for dental purposes with lithium silicate as crystal phase. The process is characterized in particular in that it allows the rapid and cost-effective production of such a blank.

BACKGROUND

Lithium silicate glass-ceramics have excellent mechanical properties, and the optical properties of natural tooth material can be imitated very well with the aid thereof. For this reason, such glass-ceramics are already extensively used for the production of aesthetically demanding dental restorations with very good mechanical properties.

The lithium silicate glass-ceramics are generally used in the form of corresponding blanks, such as blocks, discs or cylinders, from which the desired dental restorations, such as crowns or bridges, are then shaped. The shaping is usually effected by pressing at increased temperature and increased pressure or by machining in computer-aided milling devices.

For the production of lithium silicate glass-ceramics, in a first step, a corresponding starting glass is usually melted at temperatures of in particular 1300 to 1600° C. from a mixture of materials in powder form. The materials in powder form used are in particular oxides, carbonates, phosphates, borates and fluorides. In order to achieve a sufficiently homogeneous glass and, in particular, the removal of bubbles within the glass, the mixture in powder form has to be heated to the melting temperature for several hours and typically from 7 to 12 hours, which is uneconomical because of the long duration and the large quantity of energy used. The starting glass obtained is then poured into suitable moulds and transformed into the desired blanks of lithium silicate glass-ceramic via one or more heat treatments. Such a procedure is disclosed, for example, in EP 1 505 041, EP 1 688 398, U.S. Pat. Nos. 7,316,740 and 7,452,836, both of which U.S. patents are hereby incorporated by reference in their entirety.

SUMMARY

The object of the invention is therefore to provide a process for the preparation of a glass-ceramic blank for dental purposes, which avoids the disadvantages of the conventional processes and in particular allows the production of a homogeneous starting glass in a short time and using a small amount of energy.

DETAILED DESCRIPTION

This object is surprisingly achieved with the process according to the attached claims. The invention also relates to the process for the preparation of dental restorations according to the attached claims.

The process according to the invention for the preparation of a glass-ceramic blank for dental purposes with lithium silicate as crystal phase is characterized in that (a) lithium silicate blanks and/or residues of lithium silicate blanks are melted to form a glass,
(b) optionally, the molten glass is converted into a glass frit and the glass frit is melted to form a glass,
(c) the glass from step (a) or (b) is shaped into a glass blank,
(d) the glass blank is heat-treated at a temperature of in particular 450 to 600° C. in order to form a glass blank with nuclei,
(e) the glass blank with nuclei is subjected to a heat treatment at a temperature of in particular 600 to 850° C. in order to form a glass-ceramic blank with lithium metasilicate as crystal phase, or is subjected to a heat treatment at a temperature of in particular 700 to 1000° C. in order to form a glass-ceramic blank with lithium disilicate as crystal phase,
(f) optionally, the glass-ceramic blank with lithium metasilicate as crystal phase from step (e) is subjected to a heat treatment at a temperature of in particular 700 to 1000° C. in order to form a glass-ceramic blank with lithium disilicate as crystal phase, and
(g) optionally, in step (a) and/or (b) at least one chemical compound is added in order to change the chemical composition of the glass and/or of the glass frit.

Unlike in the case of conventional processes, in the case of the process according to the invention, already-produced lithium silicate blanks or residues of such blanks are used to melt the glass therefrom. It is surprising that, with the use of these blanks or the residues of such blanks, a glass which is homogeneous and therefore also substantially bubble-free can be melted in a very short time. In the case of the conventional processes, this is achieved only when the starting materials used in these processes are kept at the melting temperature over a long period of time. The production of homogeneous glasses is particularly important as any inhomogeneities in the glasses lead to the glass-ceramic blanks produced therefrom being unable to meet the stringent requirements with regard to the optical properties, in order to be used for dental purposes and in particular as dental restoration material.

The blanks used in step (a) are usually dental blanks that are no longer required but which, because of their valuable components, such as lithium oxide and transition metal oxides serving for colouring, would be very advantageous for reuse.

Residues of lithium silicate blanks and in particular residues of machined lithium silicate blanks are preferably used in step (a). These are typically residues which remain when lithium silicate blanks are milled and/or ground in order to produce a dental restoration therefrom. It is a further advantage of the process according to the invention that, with the use of these residues of blanks, components contained therein are again supplied for reuse, which is not only economically, but also ecologically advantageous. This applies in particular to lithium oxide present therein, but also to transition metal oxides present therein.

The lithium silicate blanks used in step (a) and residues of such blanks are usually first freed of any foreign material, such as metallic holders for fixing in a CAD/CAM device. Likewise, the blanks and residues of such blanks can also be comminuted before the glass is melted therefrom.

In a preferred embodiment, blanks and/or residues of blanks of lithium silicate glass or lithium silicate glass-ceramic are used in step (a). It is further preferred that the lithium silicate glass-ceramic is selected from lithium metasilicate glass-ceramic and lithium disilicate glass-ceramic and in particular is lithium metasilicate glass-ceramic. In a particularly preferred embodiment, blanks and/or residues of blanks of lithium silicate glass-ceramic with lithium metasilicate or lithium disilicate as main crystal phase are used.

The term "main crystal phase" refers to the crystal phase which has the highest proportion by mass compared with other crystal phases. The determination of the proportion by mass is effected in particular by the Rietveld method using an internal standard.

Blanks in the form of blocks, cuboids, or cylinders, in particular in the form of discs, or residues of blanks thus shaped are preferably used in step (a).

In a preferred embodiment, blanks and/or residues of blanks are used, which have items of information about their respective chemical composition, for example in the form of imprints or applied data carriers, such as chips.

In a further preferred embodiment of the process according to the invention, blanks and/or residues of blanks with different chemical composition are used in step (a), and in particular step (g) is also carried out. This also provides the possibility of using blanks or residues of blanks, without sorting these according to their chemical composition beforehand. The glass produced from these blanks or residues of blanks of different chemical composition is typically analyzed for its chemical composition. It is preferred that on the basis of this analysis, then in step (g) at least one chemical compound is added to the glass and/or the glass frit in order to modify the chemical composition thereof as desired. This at least one compound is preferably also a glass which is added in particular in the form of a glass frit. Thus, in spite of the use of different blanks or residues of such blanks, glass-ceramic blanks for dental purposes with precisely the desired chemical composition and thus in particular also the desired properties, such as special colour and translucency, can be produced.

Surprisingly, the melting of existing lithium silicate blanks or residues of such blanks and the subsequent heat treatments during the process according to the invention do not lead to a significant change in their properties and in particular their colour, when these steps are carried out in air as is usual. This can be recognized in that, when blanks or residues of blanks with an identical chemical composition are used in step (a), the process according to the invention leads to glass-ceramic blanks which have the same colour as the blanks or residues thereof used as starting material. This is surprising as during the process contact with oxygen from the air occurs at high temperatures, and there is thereby the significant risk that oxidization processes and thus a change in the oxidation number and colour of transition metal compounds used as colorants result. However, this is surprisingly not the case, with the result that blanks and residues of blanks with a particular specification in terms of their colour, after passing through the process according to the invention, lead to glass-ceramic blanks with the same specification in terms of the colour.

It is further preferred that in step (a) the blanks or residues of blanks and/or in the optional step (b) explained below the glass frit is melted at a temperature of 1200 to 1600° C., in particular 1250 to 1450° C., to give a glass. It is surprising that the melting over a short period of time of in particular 30 to 300 min and preferably 30 to 240 min, is sufficient to produce a melt with a high homogeneity. The process according to the invention is thus superior to the conventional processes, as the latter require a significantly longer melting period in order to produce a glass with a satisfactory homogeneity.

In the optional step (b), the molten glass can be transformed into a glass frit and the glass frit can be melted to form a glass. This optional step serves in particular to increase the homogeneity of the glass obtained in step (a) still further. The transformation into a glass frit typically occurs in that the molten glass is poured into water, separated and optionally further comminuted.

Furthermore, according to the optional step (g) at least one chemical compound can also still be added to the glass frit obtained in step (b) in order to change the chemical composition thereof. As already described above for step (a), this serves to adjust the chemical composition of the glass-ceramic blank finally produced in the desired manner.

In step (c) the glass from step (a) or (b) is shaped into a glass blank. This typically occurs in that the glass is poured into suitable moulds, such as metal or graphite moulds. The blank is preferably given the shape of a block, cuboid, cylinder or a disc. Blocks, circular cylinders or circular discs are particularly preferred. The shaped glass blank can also already have a holding device formed in one piece therewith, such as a holding pin.

In step (d) the glass blank is heat-treated at a temperature of in particular 450 to 600° C. in order to form a glass blank with nuclei. The nuclei are in particular those which are suitable for the crystallization of lithium metasilicate and/or lithium disilicate.

Then in step (e) the glass blank with nuclei is subjected either to a heat treatment at a temperature of in particular 600 to 850° C. in order to form a glass-ceramic blank with lithium metasilicate as crystal phase, or is subjected to a heat treatment at a temperature of in particular 700 to 1000° C. in order to form a glass-ceramic blank with lithium disilicate as crystal phase.

In addition to a direct production of the lithium disilicate glass-ceramic, the latter can also be prepared step by step, first by formation of lithium metasilicate glass-ceramic and then conversion thereof into lithium disilicate glass-ceramic. It is therefore also possible to carry out the optional step (f), in which the glass-ceramic blank with lithium metasilicate as crystal phase from step (e) is subjected to a heat treatment at a temperature of in particular 700 to 1000° C. in order to form a glass-ceramic blank with lithium disilicate as crystal phase.

The lithium silicate glass, the lithium silicate glass with nuclei and the lithium metasilicate glass-ceramic are therefore precursors of the lithium disilicate glass-ceramic.

It is preferred that the glass-ceramic blank for dental purposes prepared by the process according to the invention has lithium metasilicate or lithium disilicate as crystal phase. A glass-ceramic blank which has lithium metasilicate or lithium disilicate as main crystal phase is particularly preferred.

Furthermore, the glass-ceramic blank produced preferably contains colorants and/or fluorescent agents such as, in particular, oxides of d and f elements, preferably oxides of Ti, V, Sc, Mn, Fe, Co, Ta, W, Ce, Pr, Nd, Tb, Er, Dy, Gd, Eu and Yb.

In the preferred compositions of the glass-ceramic blank prepared that are indicated below, the amounts of the components, with the exception of fluorine, are indicated as oxides, as is usual in the case of glasses and glass-ceramics.

In a preferred embodiment, the glass-ceramic blank prepared comprises at least one and preferably all of the following components in the amounts indicated:

| Component | wt.-% |
| --- | --- |
| $SiO_2$ | 64.0 to 73.0 |
| $Li_2O$ | 12.0 to 18.0 |
| $K_2O$ | 1.0 to 5.0 |
| $Al_2O_3$ | 0.5 to 5.0 |
| $P_2O_5$ | 1.0 to 7.0 |
| ZnO | 0.5 to 6.0 |
| $Na_2O$ | 0 to 2.0 |
| $Me^{II}O$ | 0 to 7.0 |
| $ZrO_2$ | 0 to 2.0 |
| colouring and fluorescent metal oxides | 0.5 to 7.5, | wherein $Me^{II}O$ is selected from the group of CaO, BaO, SrO, MgO and mixtures thereof.

In a further preferred embodiment, the glass-ceramic blank prepared comprises at least one and preferably all of the following components in the amounts indicated:

| Component | wt.-% |
| --- | --- |
| $SiO_2$ | 64.0 to 75.0 |
| $Li_2O$ | 13.0 to 17.0 |
| $K_2O$ | 2.0 to 5.0 |
| $Al_2O_3$ | 0.5 to 5.0 |
| Nucleating agents | 2.0 to 5.0 |
| $Me^{II}O$ | 0 to 3.0 | and less than 0.1 wt.-% ZnO, wherein $Me^{II}O$ is selected from the group of CaO, BaO, MgO, SrO and mixtures thereof.

In a further preferred embodiment, the glass-ceramic blank prepared comprises at least one and preferably all of the following components in the amounts indicated:

| Component | wt.-% |
| --- | --- |
| $SiO_2$ | 55.0 to 71.0 |
| $Li_2O$ | 9.0 to 17.0 |
| $K_2O$ | 1.0 to 7.0 |
| $Al_2O_3$ | 0.5 to 5.0 |
| $P_2O_5$ | 0.5 to 12.0 |
| $ZrO_2$ | 6.1 to 20.0. |

In a further preferred embodiment, the glass-ceramic blank prepared comprises at least one and preferably all of the following components in the amounts indicated:

| Component | wt.-% |
| --- | --- |
| $SiO_2$ | 59.0 to 79.0 |
| $Li_2O$ | 8.0 to 15.0 |
| $P_2O_5$ | 0 to 9.0 |
| $Me^{I}_2O$ | 1.0 to 8.0 |
| $Me^{II}O$ | 1.0 to 9.0 |
| $Me^{III}_2O_3$ | 0 to 8.0 |
| $Me^{IV}O_2$ | 0 to 10.0 |
| $Me^{V}_2O_5$ | 0 to 8.0 |
| $Me^{VI}O_3$ | 0 to 5.0 |
| Fluorine | 0 to 1.0, | wherein $Me^{I}_2O$ is selected from the group of $K_2O$, $Na_2O$, $Rb_2O$, $Cs_2O$ and mixtures thereof, $Me^{II}O$ is selected from the group of CaO, MgO, SrO, ZnO and mixtures thereof, $Me^{III}_2O_3$ is selected from the group of $Al_2O_3$, $B_2O_3$, $Y_2O_3$, $La_2O_3$, $Ga_2O_3$, $In_2O_3$ and mixtures thereof, $Me^{IV}O_2$ is selected from the group of $ZrO_2$, $TiO_2$, $SnO_2$, $CeO_2$, $GeO_2$ and mixtures thereof, $Me^{V}_2O_5$ is selected from the group of $V_2O_5$, $Ta_2O_5$, $Nb_2O_5$ and mixtures thereof, and $Me^{VI}O_3$ is selected from the group of $WO_3$, $MoO_3$ and mixtures thereof.

In a further preferred embodiment, the glass-ceramic blank produced according to the invention has a holding device for fixing in a processing device, such as in particular a milling or grinding device. This holding device can be attached to the glass-ceramic blank produced, e.g. adhered to, or it can also already be formed in one piece with the glass-ceramic blank and therefore consist of the same material as the blank.

The glass-ceramic blank produced serves in particular for the preparation of dental restorations. The invention is therefore also directed to a process for the preparation of dental restorations, in which a glass-ceramic blank produced by means of the process according to the invention is given the shape of the dental restorations by pressing or machining.

The dental restorations produced according to the invention are preferably selected from crowns, abutments, abutment crowns, inlays, onlays, veneers, shells and bridges, as well as overstructures for multi-part restoration frameworks which can consist e.g. of oxide ceramic, metals or dental alloys.

The pressing is usually effected at increased pressure and at increased temperature. It is preferred that the pressing is effected at a pressure of 2 to 10 bar and a temperature of 700 to 1200° C. During pressing, the desired shape change is achieved by viscous flow of the material used.

The machining is usually effected by material-removing processes and in particular by milling and/or grinding. It is preferred that the machining is effected by computer-controlled milling and/or grinding devices. Particularly preferably, the machining is effected as part of a CAD/CAM process.

The invention finally also relates to the use of the glass-ceramic blank prepared by the process according to the invention for the preparation of dental restorations, wherein the glass-ceramic blank is given the shape of the dental restorations by pressing or machining.

The invention is explained in more detail below with reference to examples.

EXAMPLES

Example 1—Use of Block Residues of the Same Type

Residues of commercial CAD/CAM blocks (IPS e.max CAD LT A2 from Ivoclar Vivadent AG) were melted at a temperature of 1370° C. for 2 hours to form a glass with a high homogeneity. The glass melt obtained was poured into graphite moulds to form blocks. The glass blocks were transferred into a furnace preheated to 500° C. and kept there for 10 min at 500° C. in order to produce nuclei in the glass. The stress relief of the blocks was then effected in that they were cooled to room temperature in the closed furnace at a rate of about 3 to 5 K/min. The blocks were then heat-treated at 700° C. for 20 min to form a glass-ceramic with lithium metasilicate as main crystal phase. The glass-ceramic blocks obtained corresponded in terms of their properties precisely to those of the commercial IPS e.max CAD LT A2 blocks, as could be determined in particular by means of chemical analysis and X-ray diffraction analysis.

Discs were sawed off the glass-ceramic blocks obtained and these discs were heat-treated at 850° C. for 10 min (Ivoclar Vivadent AG Programat furnace, standard program for IPS e.max CAD LT A2), to form a glass-ceramic with lithium disilicate as main crystal phase. The Lab values of these finally crystallized discs were determined by means of a Konica Minolta spectrophotometer CM-3700d. In addition, their contrast value (CR value) was also determined as a measure of the translucency according to British Standard BS 5612. In the following table, the values obtained are compared to those of finally crystallized commercial IPS e.max CAD LT A2 blocks as standard.

|  | L* | a* | b* | CR value | ΔE* |
|---|---|---|---|---|---|
| Standard | 78.66 | 5.65 | 25.60 | 77.43 | — |
| Example 1 | 79.03 | 5.17 | 24.93 | 77.92 | 0.91 |

The small colour distance ΔE* of only 0.91 proves that, between the blocks produced and the commercial blocks, there is no perceptible colour difference in the finally crystallized state. In addition, the difference in the contrast value is only marginal, with the result that overall the optical properties of the blocks produced correspond precisely to those of the commercial blocks.

Finally, both the chemical analysis and the X-ray diffraction analysis showed that in terms of their composition the blocks produced also correspond precisely to the commercial blocks.

Example 2—Use of Block Residues of Different Types

Residues of commercial CAD/CAM blocks, namely 50 wt.-% IPS e.max CAD LT A1 and 50 wt.-% e.max CAD BL2 (in each case from Ivoclar Vivadent AG), were mixed, and the mixture was melted at a temperature of 1370° C. for 2 h to form a glass. The glass was then fritted by pouring into water and the chemical composition of the starting frit produced was determined by analyses.

On the basis of these analyses, a corrective frit was calculated and produced which, together with the starting frit, is suitable for producing commercial CAD/CAM blocks of the IPS e.max CAD LT A2 type as end product. The chemical composition of the corrective frit is indicated in the following table.

Chemical Composition of Corrective Frit

| Component | wt.-% |
|---|---|
| $SiO_2$ | 70.36 |
| $Li_2O$ | 14.91 |
| $K_2O$ | 3.99 |
| $Al_2O_3$ | 3.25 |
| $P_2O_5$ | 3.16 |
| $ZrO_2$ | 0.78 |
| $CeO_2$ | 2.61 |
| $V_2O_5$ | 0.15 |
| $Tb_4O_7$ | 0.51 |
| $Er_2O_3$ | 0.28 |

The starting frit and the corrective frit were mixed in a ratio of 50 wt.-% to 50 wt.-% and the mixture was again melted at 1370° C. for 2 h.

The glass melt obtained was poured into graphite moulds to form blocks. The glass blocks were transferred into a furnace preheated to 500° C. and kept there for 10 min at 500° C. in order to produce nuclei in the glass. The stress relief of the blocks was then effected in that they were cooled to room temperature in the closed furnace at a rate of about 3 to 5 K/min. The blocks were then heat-treated at 700° C. for 20 min to form a glass-ceramic with lithium metasilicate as main crystal phase. The glass-ceramic blocks obtained corresponded in terms of their properties precisely to those of the commercial IPS e.max CAD LT A2 blocks, as could be determined in particular by means of chemical analysis and X-ray diffraction analysis.

Discs were sawn off the glass-ceramic blocks obtained and these discs were heat-treated at 850° C. for 10 min (Ivoclar Vivadent AG Programat furnace, standard program for IPS e.max CAD LT A2) in order to form a glass-ceramic with lithium disilicate as main crystal phase. The Lab values of these finally crystallized discs were determined by means of a Konica Minolta spectrophotometer CM-3700d. In addition, their contrast value (CR value) was determined as a measure of the translucency according to British Standard BS 5612. In the following table, the values obtained are compared to those of finally crystallized commercial IPS e.max CAD LT A2 blocks as standard.

|  | L* | a* | b* | CR value | ΔE* |
|---|---|---|---|---|---|
| Standard | 78.66 | 5.65 | 25.60 | 77.43 | — |
| Example 2 | 79.29 | 5.17 | 25.69 | 76.67 | 0.80 |

The small colour distance ΔE* of only 0.80 proves that, between the blocks produced and the sought commercial blocks of the IPS e.max CAD LT A2 type, there is no perceptible colour difference in the finally crystallized state. In addition, the difference in the contrast value is only marginal, with the result that overall the optical properties of the blocks produced correspond precisely to those of the desired commercial blocks.

Finally, both the chemical analysis and the X-ray diffraction analysis showed that in terms of their composition the blocks produced also correspond precisely to the desired commercial blocks.

The invention claimed is:

1. Process for the preparation of a glass-ceramic blank for dental purposes with lithium silicate as crystal phase, comprising
   (a) lithium silicate blanks with different chemical composition or residues of lithium silicate blanks with different chemical composition are melted to form a glass,
   (b) optionally, the molten glass is converted into a glass frit and the glass frit is melted to form a glass,
   (c) the glass from step (a) or (b) is shaped into a glass blank,
   (d) the glass blank is heat-treated at a temperature of 450 to 600° C. in order to form a glass blank with nuclei,
   (e) the glass blank with nuclei is subjected to a heat treatment at a temperature of 600 to 850° C. in order to form a glass-ceramic blank with lithium metasilicate as crystal phase, or is subjected to a heat treatment at a temperature of 700 to 1000° C. in order to form a glass-ceramic blank with lithium disilicate as crystal phase,
   (f) optionally, the glass-ceramic blank with lithium metasilicate as crystal phase from step (e) is subjected to a heat treatment at a temperature of 700 to 1000° C. in order to form a glass-ceramic blank with lithium disilicate as crystal phase, and (g) optionally, in step (a) and/or (b) at least one chemical compound is added in order to change the chemical composition of the glass and/or of the glass frit.

2. Process according to claim 1, in which in step (a) residues of machined lithium silicate blanks are used.

3. Process according to claim 1, in which in step (a) blanks or residues of blanks of lithium silicate glass or lithium silicate glass-ceramic are used.

4. Process according to claim 3, in which the lithium silicate glass-ceramic is selected from lithium metasilicate glass-ceramic and lithium disilicate glass-ceramic.

5. Process according to claim 1, in which in step (a) blanks in the form of blocks, discs, or cylinders, residues of the blanks are used.

6. Process according to claim 1, in which in step (a) the blanks or residues of blanks and/or in step (b) the glass frit are melted at a temperature of 1200 to 1600° C., to form a glass.

7. Process according to claim 1, in which in step (a) the blanks or residues of blanks and/or in step (b) the glass frit is melted for a period of from 30 to 300 min, to form a glass.

8. Process according to claim 1, in which in step (c) the glass is shaped into a glass blank by pouring into a mould.

9. Process according to claim 1, in which the glass-ceramic blank prepared has lithium metasilicate or lithium disilicate as a crystal phase.

10. Process for the preparation of dental restorations, in which a glass-ceramic blank is prepared by the process comprising
(a) lithium silicate blanks with different chemical composition or residues of lithium silicate blanks with different chemical composition are melted to form a glass,
(b) optionally, the molten glass is converted into a glass frit and the glass frit is melted to form a glass,
(c) the glass from step (a) or (b) is shaped into a glass blank,
(d) the glass blank is heat-treated at a temperature of 450 to 600° C. in order to form a glass blank with nuclei,
(e) the glass blank with nuclei is subjected to a heat treatment at a temperature of 600 to 850° C. in order to form a glass-ceramic blank with lithium metasilicate as crystal phase, or is subjected to a heat treatment at a temperature of 700 to 1000° C. in order to form a glass-ceramic blank with lithium disilicate as crystal phase,
(f) optionally, the glass-ceramic blank with lithium metasilicate as crystal phase from step (e) is subjected to a heat treatment at a temperature of 700 to 1000° C. in order to form a glass-ceramic blank with lithium disilicate as crystal phase, and
(g) optionally, in step (a) and/or (b) at least one chemical compound is added in order to change the chemical composition of the glass and/or of the glass frit, and
wherein the glass-ceramic blank prepared is given the shape of the dental restorations by pressing or machining.

11. Process of using the glass-ceramic blank prepared by the process according to claim 1 for the preparation of dental restorations, comprising pressing or machining the glass-ceramic blank to form the dental restoration.

12. Process according to claim 4, in which the lithium silicate glass-ceramic is a lithium metasilicate glass-ceramic.

13. Process according to claim 5, in which the blanks are in the form of discs.

14. Process according to claim 7, in which the glass frit is melted for a period of from 30 to 240 min to form a glass.

15. Process according to claim 9, in which the glass-ceramic blank prepared has lithium metasilicate or lithium disilicate as main crystal phase.

16. Process according to claim 1, in which step (g) is also carried out.

17. Process according to claim 6, in which in step (a) the blanks or residues of blanks and/or in step (b) the glass frit are melted at a temperature of 1250 to 1450° C., to form a glass.

* * * * *